(12) United States Patent
Lin et al.

(10) Patent No.: US 9,648,461 B2
(45) Date of Patent: *May 9, 2017

(54) CONSTRAINT-BASED SCHEDULING FOR DELIVERY OF LOCATION INFORMATION

(71) Applicant: Microsoft Corporation, Redmond, WA (US)

(72) Inventors: Jyh-Han Lin, Mercer Island, WA (US); Chester Overstead Murphy, Gig Harbor, WA (US); Gang Zhao, Redmond, WA (US); Karon A. Weber, Kirkland, WA (US); Katrika Morris, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/223,625

(22) Filed: Mar. 24, 2014

(65) Prior Publication Data

US 2014/0206387 A1    Jul. 24, 2014

Related U.S. Application Data

(63) Continuation of application No. 12/464,892, filed on May 13, 2009, now Pat. No. 8,682,342.

(51) Int. Cl.
*H04Q 7/10* (2006.01)
*H04W 4/02* (2009.01)
*H04L 29/08* (2006.01)

(52) U.S. Cl.
CPC ............. *H04W 4/028* (2013.01); *H04L 67/04* (2013.01); *H04L 67/18* (2013.01); *H04L 67/325* (2013.01); *H04W 4/02* (2013.01); *H04W 4/021* (2013.01)

(58) Field of Classification Search
CPC ....... H04W 4/02; H04W 64/00; H04W 4/021; H04W 4/028; H04W 4/023
USPC ............................................ 455/456.2, 456.3
See application file for complete search history.

(56) References Cited

U.S. PATENT DOCUMENTS

| 7,941,133 | B2 * | 5/2011 | Aaron | ................. | G06Q 10/109 |
| | | | | | 379/201.06 |
| 8,264,403 | B2 * | 9/2012 | Rahman | ................. | G01S 19/34 |
| | | | | | 342/357.4 |
| 2005/0043037 | A1 * | 2/2005 | Ioppe | .................... | H04W 4/02 |
| | | | | | 455/456.1 |

(Continued)

OTHER PUBLICATIONS

Ahn, et al., "Location Polling Algorithm for Alerting Service Based on Location", Retrieved at <<http://www.springerlink.com/content/7w64488623881747/fulltext.pdf>>, W2GIS 2005, LNCS 3833, pp. 104-114, 2005.

(Continued)

*Primary Examiner* — Ajit Patel
*Assistant Examiner* — Julio Perez

(57) ABSTRACT

Defining subscriptions to location information for a computing device (e.g., a mobile computing device). Application programs, services, and/or peer devices define the subscriptions based on constraints associated with requests for the location information. A location request scheduler coordinates the subscriptions temporally and spatially to reduce the quantity of the requests from the computing device. In some embodiments, the subscriptions are automatically defined based on an observed mobility pattern of the computing device.

20 Claims, 7 Drawing Sheets

(56) References Cited

U.S. PATENT DOCUMENTS

| | | | |
|---|---|---|---|
| 2007/0005419 A1 | 1/2007 | Horvitz et al. | |
| 2008/0014964 A1* | 1/2008 | Sudit | H04L 43/06 455/456.1 |
| 2009/0005077 A1 | 1/2009 | Forstall et al. | |
| 2009/0149193 A1* | 6/2009 | Lamprecht | H04W 4/02 455/456.1 |
| 2009/0247191 A1* | 10/2009 | Sennett | H04W 4/02 455/456.3 |
| 2010/0081456 A1 | 4/2010 | Singh et al. | |
| 2010/0159945 A1* | 6/2010 | Brisebois | H04W 4/02 455/456.1 |
| 2010/0291950 A1 | 11/2010 | Lin et al. | |

OTHER PUBLICATIONS

Cugola, et al., "On Introducing Location Awareness in Publish-Subscribe Middleware", Retrieved at <<http://zeus.elet.polimi.it/reds/location.pdf>>, Proceedings of the 25th IEEE International Conference on Distributed Computing Systems Workshops (ICDCSW'05), 2005 IEEE, pp. 1-6.

"ClickLocate", Retrieved at <<http://www.clicksoftware.com/pdf/ClickLocate_brochure_US.pdf>>, Oct. 2006, 4 pages.

Spanoudakis, et al., "Extensible Platform for Location Based Services Provisioning", Retrieved at <<http://ieeexplore.ieee.org/ielx5/9036/28684/01286788.pdf?arnumber=1286788&htry=8>>, Proceedings of the Fourth International Conference on Web Information Systems Engineering Workshops (WISEW'03), 2004 IEEE, pp. 1-8.

Gruteser, et al., "Anonymous Usage of Location-Based Services through Spatial and Temporal Cloaking", Retrieved at <<http://www.winlab.rutgers.edu/~gruteser/papers/gruteser_anonymous_lbs.pdf>>, Oct. 2003, 12 Pages.

"Spatio-Temporal Data Mining for Location-Based Services", Retrieved at <<http://gyozo.gidofalvi.net/docs/STDM.PDF>>, 2007, pp. 1-22.

"Location Framework Overview", Retrieved at <<http://msdn.microsoft.com/en-us/library/aa912812.aspx>>, 2008, 1 page.

"Location Framework Architecture Diagram", Retrieved at <<http://msdn.microsoft.com/en-us/library/aa914258(printer).aspx>>, 2008, 1 page.

Clark, et al., "Predicts 2009: Context-Aware Computing Gains Momentum", Jan. 2009, pp. 1-7.

"Non-Final Office Action in U.S. Appl. No. 12/464,892", Mailed Date: Sep. 28, 2011, 11 pages.

"Final Office Action in U.S. Appl. No. 12/464,892", Mailed Date: May 23, 2012, 21 pages.

"Advisory Action in U.S. Appl. No. 12/464,892", Mailed Date: Aug. 3, 2012, 3 pages.

"Non-Final Office Action in U.S. Appl. No. 12/464,892", Mailed Date: Jun. 6, 2013, 7 pages.

"Notice of Allowance in U.S. Appl. No. 12/464,892", Mailed Date: Nov. 4, 2013, 10 pages.

* cited by examiner

CONSTRAINT-BASED SCHEDULING FOR DELIVERY OF LOCATION INFORMATION

CROSS-REFERENCE TO RELATED APPLICATION

This application is a continuation of U.S. application Ser. No. 12/464,892, filed May 13, 2009, the entirety of which is hereby incorporated by reference herein.

BACKGROUND

Applications executing on mobile computing devices such as telephones, laptops, and netbooks asynchronously request and process location information such as global positioning system (GPS) data. The location providers (e.g., GPS systems) generate and deliver location reports responsive to the requests. However, as additional application programs, as well as services or nearby peer devices, request the location information and request such information more frequently, performance of the mobile computing device and delivery framework degrades. For example, battery life and responsiveness of devices with limited power and processing resources worsen as the frequency and quantity of requests increases. Existing systems lack a framework to define, align, and combine the requests for the location information.

SUMMARY

Embodiments of the invention access subscriptions to location information relating to a computing device. The subscriptions each include a time value and identify a requesting application program. A report time is defined based on the time values, and the location information is generated at the defined report time. A plurality of the subscriptions is selected based on the time values, and the generated location information is provided to the application programs associated with the selected subscriptions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
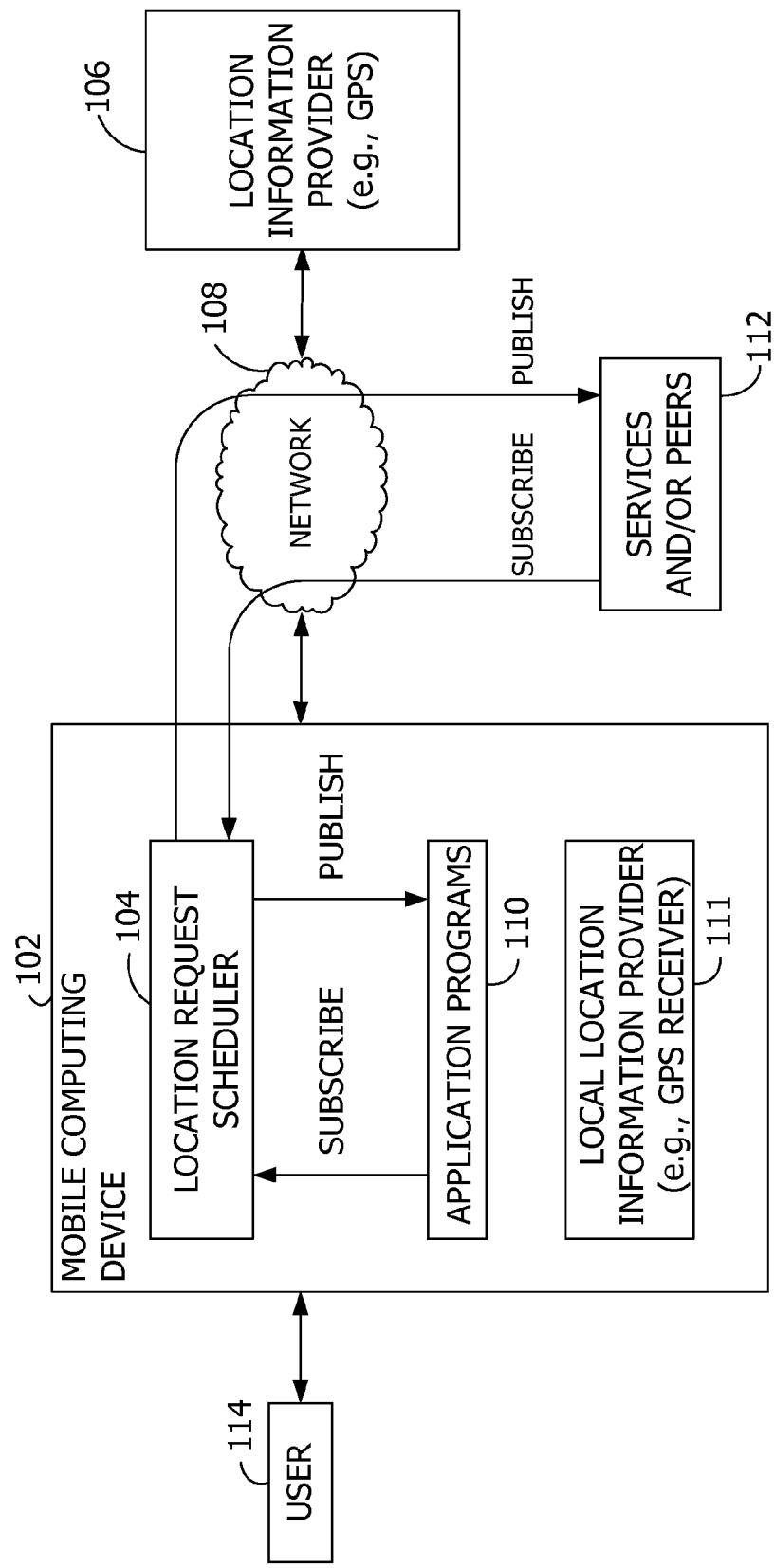
FIG. 1 is an exemplary block diagram illustrating a mobile computing device coordinating requests for location information.

Referring to the figures, embodiments of the disclosure enable, at least, a push-oriented model for temporally and spatially coordinating the obtaining and delivery of location information to a computing device 202 based on constraints and rules. A location request scheduler 104, executing on the computing device 202 in some embodiments, analyzes subscriptions 208 by application programs 110 executing on the computing device 202, services, and peer devices for the location information to perform the coordination or synchronization. In some embodiments, the coordination enables the aggregation and optimization of location information delivery thereby reducing the quantity of requests from the computing device 202, reducing the load on location sensing subsystems of the computing device 202, and reducing processing of notifications of the received location information. In embodiments in which the computing device 202 is a mobile computing device 102, operation of the location request scheduler 104 results in increased cellular radio sleep time and hence increased battery longevity.

Additionally, aspects of the disclosure provide benefits to the user 114 including, but not limited to, one or more of the following: increased productivity, appropriate and timely information delivery, and location based information serendipity.

While aspects of the invention are described with reference to the computing device 202 being the mobile computing device 102 such as a mobile telephone or a mobile netbook, embodiments of the invention are operable with any computing device. For example, aspects of the invention are operable with devices such as digital cameras, digital video cameras, laptop computers, gaming consoles (including handheld gaming consoles), portable music players, a personal digital assistant, an information appliance, and a personal communicator.

Referring again to FIG. 1, an exemplary block diagram illustrates the mobile computing device 102 coordinating requests for location information. The requests for the location information originate from a plurality of entities including, but not limited to, the application programs 110 executing on the mobile computing device 102, remote services and/or peers 112, or other entities having access to the mobile computing device 102. For example, the remote services are accessible to the mobile computing device 102 via a network 108 such as the Internet, while the peers are accessible via technology such as BLUETOOTH communication services. The mobile computing device 102 includes the location request scheduler 104, or other logic for coordinating the requests for the location information. In some embodiments, the location request scheduler 104 receives the requests as the subscriptions 208 from the application programs 110 and the services and/or peers 112.

At a time determined by the location request scheduler 104 based at least on the subscriptions 208, the mobile computing device 102 fulfills the requests for the location information by communicating with a location information provider 106 (e.g., via the network 108). For example, the location request scheduler 104 provides each of the application programs 110 with a scheduled time to request the location information, or the location request scheduler 104 maintains a queue of the requests for location information received from the application programs 110 and obtains the location information at the schedule time.

The location information provider 106 includes any service, application, logic, or the like that provides the mobile computing device 102 with an approximate or exact location of the mobile computing device 102. In some embodiments, the location information provider 106 communicates with the mobile computing device 102 via the network 108 to convey global positioning system (GPS) information. In such embodiments, the location information provider 106 may represent a network of satellites providing the location information to a local location information provider 111 (e.g., a GPS receiver) accessible by the mobile computing device 102. The local location information provider 111 may be internal or external to the mobile computing device 102. In other embodiments, the location information provider 106 communicates with the network of satellites to obtain and relay the location information to the mobile computing device 102. The location information provider 106 may also provide Wi-Fi positioning information, cellular identification (e.g., for sector information), reverse Internet Protocol information (e.g., for tracing calls), assist information, and other location-related information to the mobile computing device 102.

In general, the location information includes one or more of the following: a position of the mobile computing device 102 (e.g., an absolute position such as a latitude and longitude value, or a position relative to another object or device), information describing an area surrounding the position (e.g., neighborhood information, census information, etc.), business information associated with the area surrounding the position (e.g., names and telephone numbers of local businesses, coupons to local businesses, etc.), and the like. Further, the location information may take other forms such as a location report, location metadata, and the like.

Upon receipt of the location information or sometime thereafter, the location request scheduler 104 publishes or otherwise provides the application programs 110 and services and/or peers 112 with the received location information.

In the embodiment of FIG. 1, the mobile computing device 102 is associated with a user 114. In other embodiments, the mobile computing device 102 is associated with a plurality of users, or no users. For example, the mobile computing device 102 may be a tracking device associated with an object (e.g., an automobile).

Figure 2:
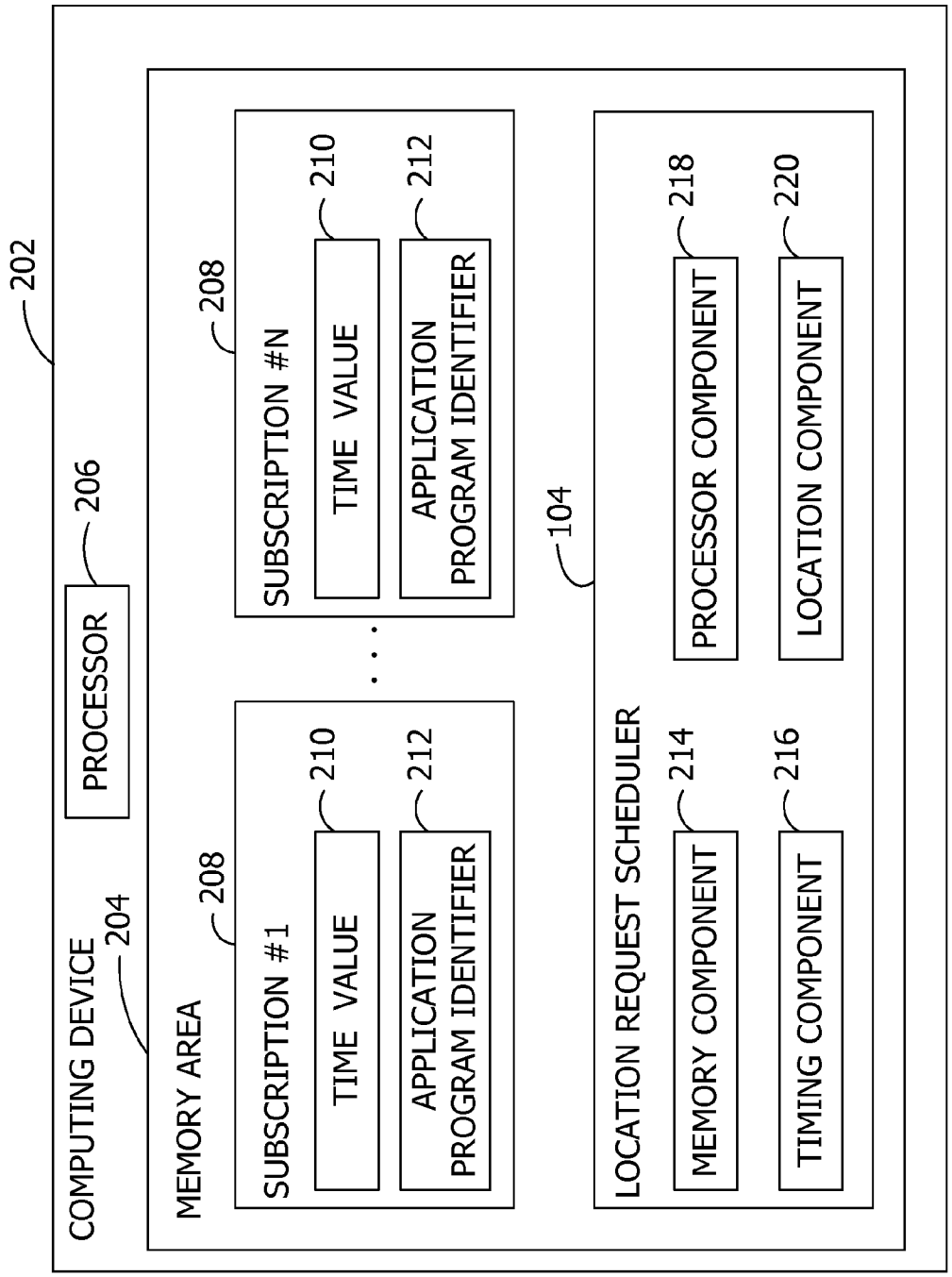
FIG. 2 is an exemplary block diagram illustrating a location request scheduler accessing subscriptions stored in a memory area.

Referring next to FIG. 2, an exemplary block diagram illustrates the location request scheduler 104 accessing the subscriptions 208 stored in a memory area 204. In the example of FIG. 2, the location request scheduler 104 executes on the computing device 202. The computing device 202 includes at least the memory area 204 and a processor 206. The memory area 204 stores one or more of the subscriptions 208 such as subscription #1 through subscription #N. In the example of FIG. 2, each of the subscriptions 208 has a time value 210 and an application program identifier 212 associated therewith. In other examples, the subscriptions 208 identify the constraints associated with the request for the location information. The time value 210 represents a time at or during which the application program 110 identified by the application program identifier 212 wants to receive the location information. The time value 210 includes, for example, an exact time (e.g., 12:15 pm), one or more time intervals (e.g., 12:10 pm to 12:20 pm, and 12:35 pm-1:15 pm), an approximate time (e.g., 12:15 pm, plus or minus five minutes), and/or other mechanisms for defining a desired time to receive the location information. The application program identifier 212 includes any means for identifying the application program 110 associated with the subscription 208. The application program identifier 212 includes, for example, an alphabetic and/or numeric text string identifying the application program 110, a link or path to the application program 110 executing on the computing device 202, and/or a uniform resource locator (URL) referencing a remote computing device on which the application program 110 is or will execute.

The memory area 204, or one or more computer-readable media, further stores computer-executable components for implementing aspects of the disclosure. Exemplary components include a memory component 214, a timing component 216, a processor component 218, and a location component 220. These components represent exemplary structure for the logic within the location request scheduler 104, although other structures are contemplated for implementing the functionality described herein. The exemplary components illustrated in FIG. 2 are described below with reference to FIG. 4.

In general, the memory area 204 is associated with the computing device 202. For example, in FIG. 2, the memory area 204 is within the computing device 202. However, the memory area 204 or any of the data stored thereon may be associated with any server or other computer, local or remote from the computing device 202 (e.g., accessible via a network).

The processor 206 includes any quantity of processing units, and is programmed to execute computer-executable instructions for implementing aspects of the disclosure. The instructions may be performed by the processor 206 or by multiple processors executing within the computing device 202, or performed by a processor external to the computing device 202 (e.g., by a cloud service). In some embodiments, the processor 206 is programmed to execute instructions such as those illustrated in the figures (e.g., FIG. 3 and FIG. 6).

Figure 3:
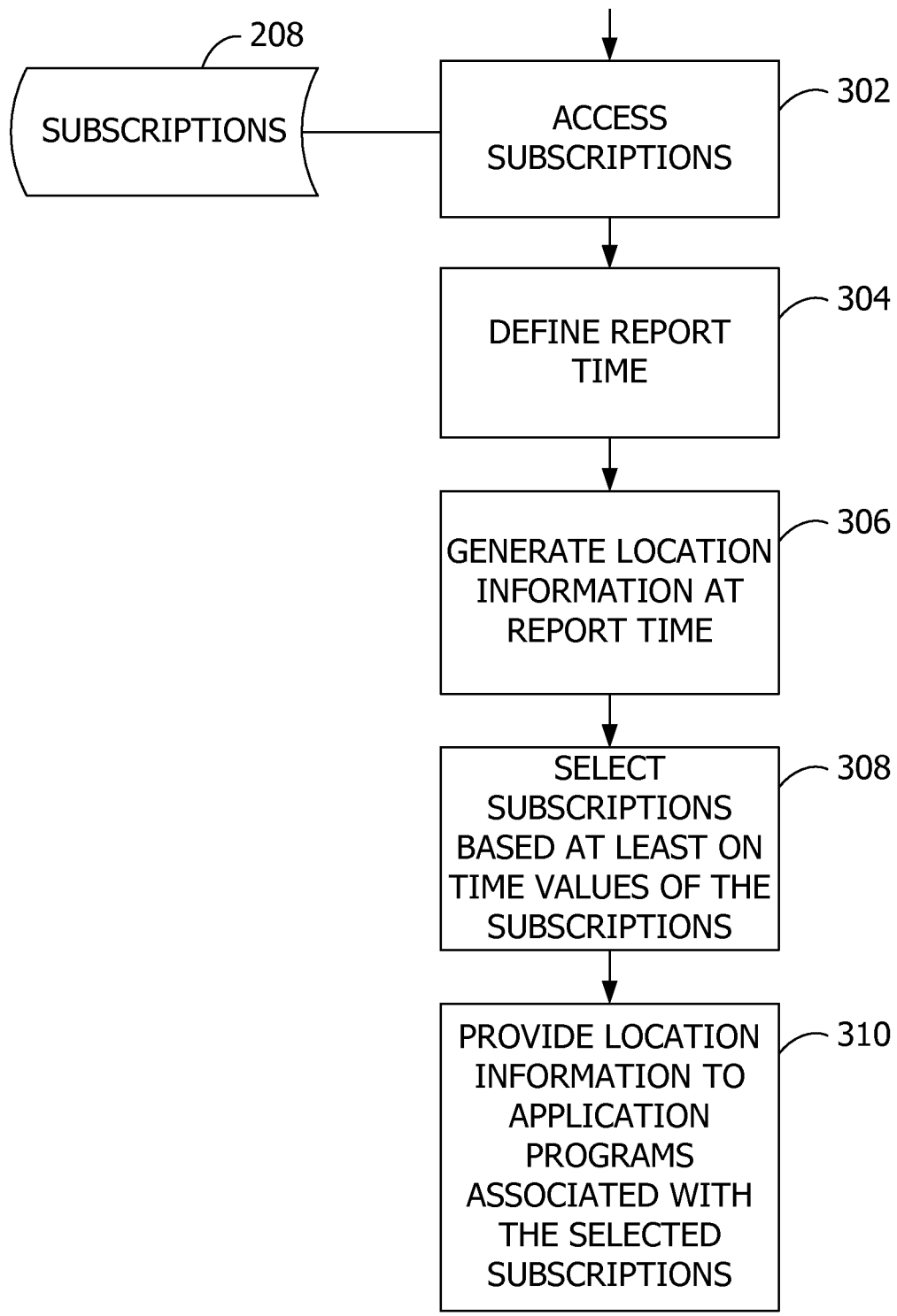
FIG. 3 is an exemplary flow chart illustrating the scheduling of the distribution of location information based on subscriptions.

Referring next to FIG. 3, an exemplary flow chart illustrates the scheduling of the distribution of the location information based on the subscriptions 208. One or more of the subscriptions 208 are accessed at 302. In general, the subscriptions 208 specify a type of event, parameters for the event, and actions to take when the event occurs.

A report time is defined at 304 based at least on the time values 210 associated with the accessed subscriptions 208. For example, if a plurality of the subscriptions 208 have the same time values 210 or approximately equal time values 210 (e.g., within an accepted, pre-defined tolerance), the report time is defined to coincide with the time values 210. Alternatively or in addition to temporally clustering the subscriptions 208, the subscriptions 208 may be spatially clustered. For example, based on a history of requests for the location information or expressed preferences, if two of the application programs 110 separately want the location information while the computing device 202 is at separate yet nearby locations (e.g., location affinity), the location request scheduler 104 aligns the requests so that a single request produces the location information that is then provided to both of the two applications. Alternatively, the location request scheduler 104 launches the two application programs at approximately the same time and in the same geographical neighborhood. The two application programs then issue requests, separately or combined, for the location information.

At the defined report time, the location information is generated at 306. For example, the location information is generated by obtaining or receiving the location information from the location information provider 106, by obtaining or receiving the location information from another device such as a peer device co-located with the computing device 202, or by calculating the location information based on other available data such as data obtained from local cellular towers. In some embodiments, there are multiple peer devices.

At 308, one or more of the subscriptions 208 are selected based at least on the time values 210 used to define the report time. For example, if three of the subscriptions 208 have approximately equal time values 210, the subscriptions 208 are selected at 308 to receive the location information generated at 306. The location information is provided at 310 to the application programs 110 associated with the selected subscriptions.

Figure 4:
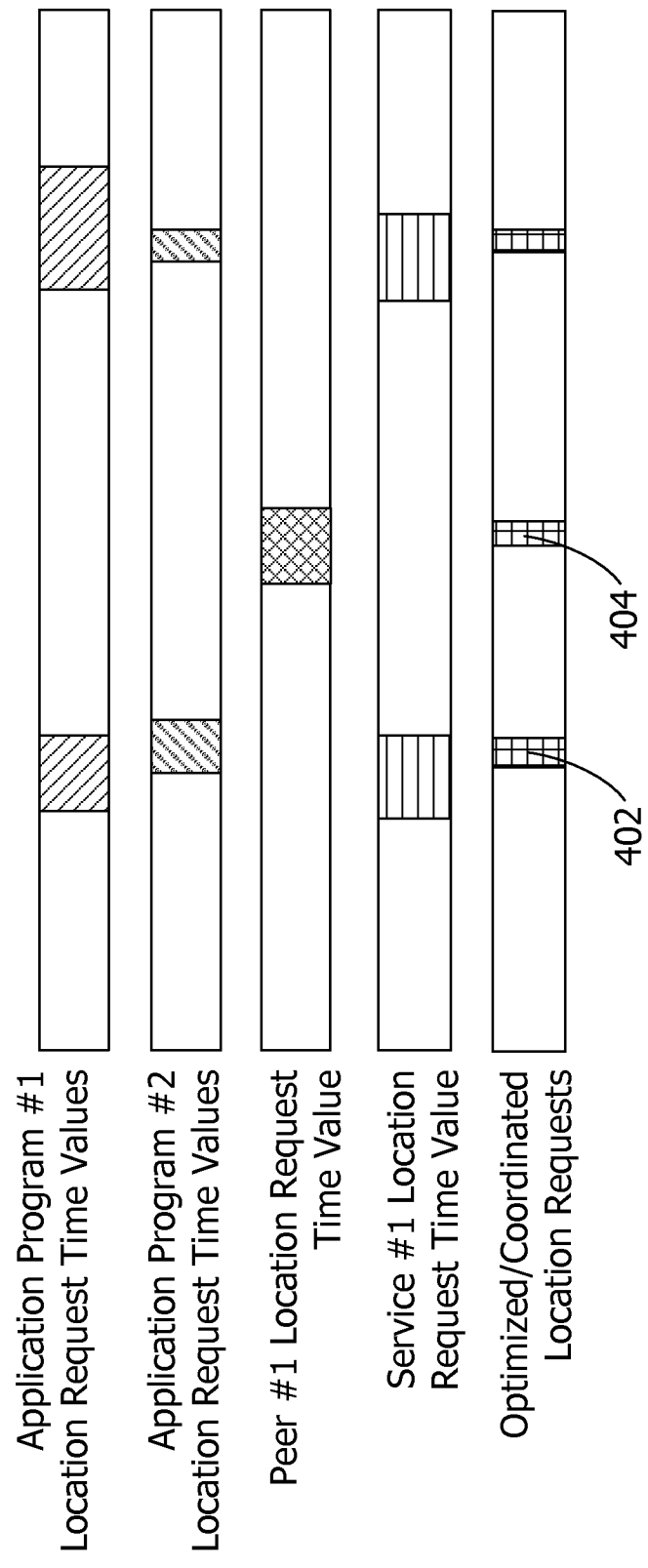
FIG. 4 is an exemplary block diagram illustrating desired times for location request from several applications and a set of coordinated report times based on the desired times.

Referring next to FIG. 4, an exemplary block diagram illustrates desired times for location request from several applications and a set of coordinated report times based on the desired times. The time values 210 for each of application #1, application #2, peer #1, and service #1 are displayed as time intervals on separate timelines in FIG. 4. The location request scheduler 104 compares the time values 210 with each other to define the report times, as shown in the timeline labeled "optimized/coordinated location requests." The report times reflect opportunistic piggybacking of the location requests.

In some embodiments, the report times are defined by the execution of the computer-executable components illustrated in FIG. 2. For example, the memory component 214 accesses the subscriptions 208 associated with application program #1, application program #2, peer #1, and service #1. The timing component 216 organizes the subscriptions 208 into one or more groups based at least on the time values 210 associated with the subscriptions 208 accessed by the memory component 214. In an example in which one or more locations are associated with each of the subscriptions 208, the timing component 216 organizes the subscriptions 208 based on geographic proximity of the locations. The timing component 216 defines a group time value for each of the groups. The group time values are shown in the timeline in FIG. 4 labeled "optimized/coordinated location requests."

The processor component 218 executes, at each of the group time values, the application programs 110 associated with the subscriptions in the group associated with the group time values. For example, at group time value 402, application program #1 and application program #2 are executed by the processor component 218. Similarly, the processor component 218 instructs service #1 to execute. Responsive to a request from one or more of the executing application programs (e.g., application program #1 or application program #2) or the service #1, the location component 220 generates the location information and provides the generated location information to the executing application programs and service. In other embodiments, the location component 220 automatically provides the location information when initiating execution of the application programs and service.

At group time value 404, the processor component 218 notifies peer #1 to execute or otherwise prepare to receive the location information from the location component 220.

Figure 5:
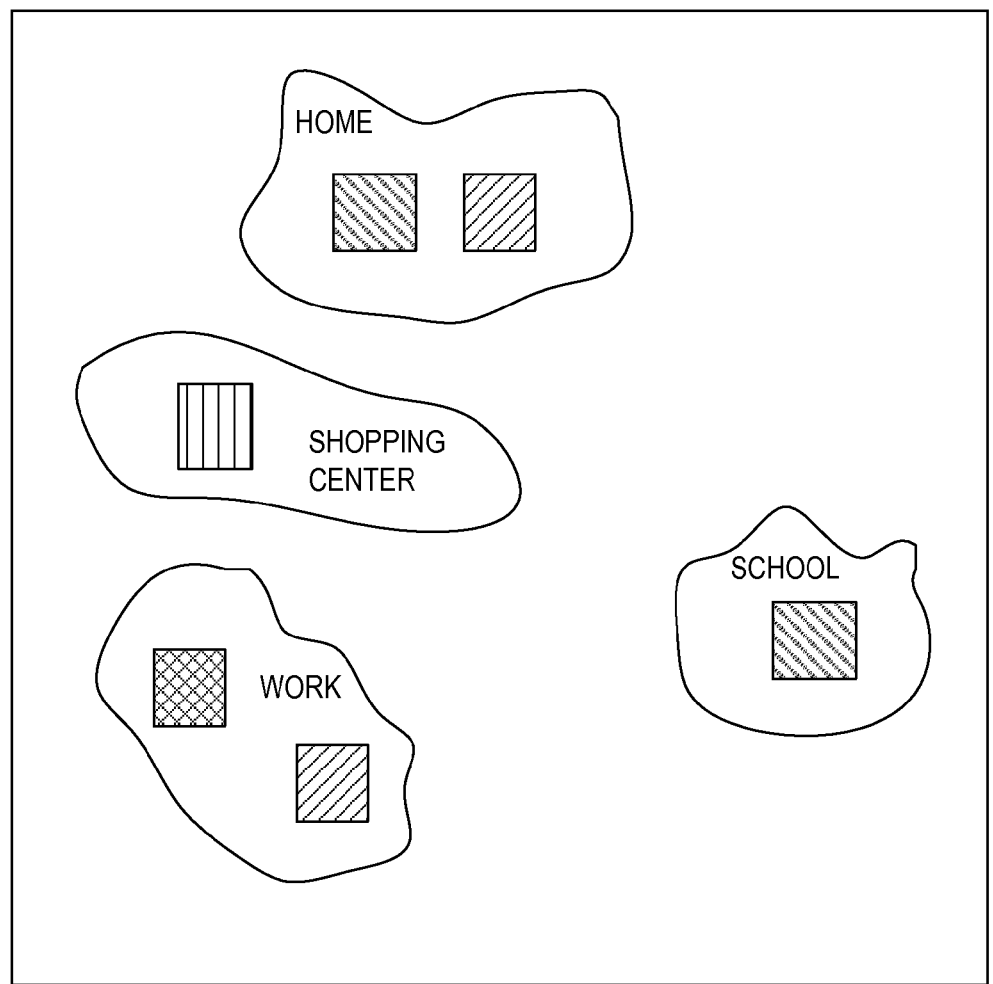
FIG. 5 is an exemplary block diagram illustrating the coordination of location requests based on geofenced regions within a map.

Referring next to FIG. 5, an exemplary block diagram illustrates the coordination of location requests based on geofenced regions within a map 502. In the example of FIG. 5, there are four geofenced regions: school, home, shopping center, and work. Using the crosshatch patterns from FIG. 4, application program #1 generates location requests when the computing device 202 is located in the Home and Work geofenced regions. Application program #2 generates location requests when the computing device 202 is located in the Home and School geofenced regions. Peer #1 requests location information when the computing device 202 is located in the Work geofenced region. Service #1 requests location information when the computing device 202 is located in the Shopping Center geofenced region.

The location request scheduler 104 coordinates the requests in this example based on the geofenced regions. For example, when the computing device 202 enters the Home region, the location request scheduler 104 shares any location information received while in this region with both application program #1 and application program #2. Similarly, when the computing device 202 enters the Work region, the location request scheduler 104 shares any location information received while in this region with both application program #1 and peer #1. The location request schedule shares this information in an attempt to reduce the quantity of location requests that are expected to be generated in each of the regions.

In other embodiments, the geofenced regions act as location triggers. For example, when the computing device 202 crosses into one of the geofenced regions, the location requests scheduler 104 notifies the application programs, peers, or services that have historically requested location information from this region that the computing device 202 has entered the region. In another example, the location request scheduler 104 automatically obtains location information that has historically been of interest to the application programs, peers, or services that have previously requested such information when the computing device 202 was in this region. For example, the location request scheduler 104 may obtain event information or traffic patterns, or perform actions such obtaining data based on pre-determined queries, determine a next set of appointments, or changing a travel route.

Figure 6:
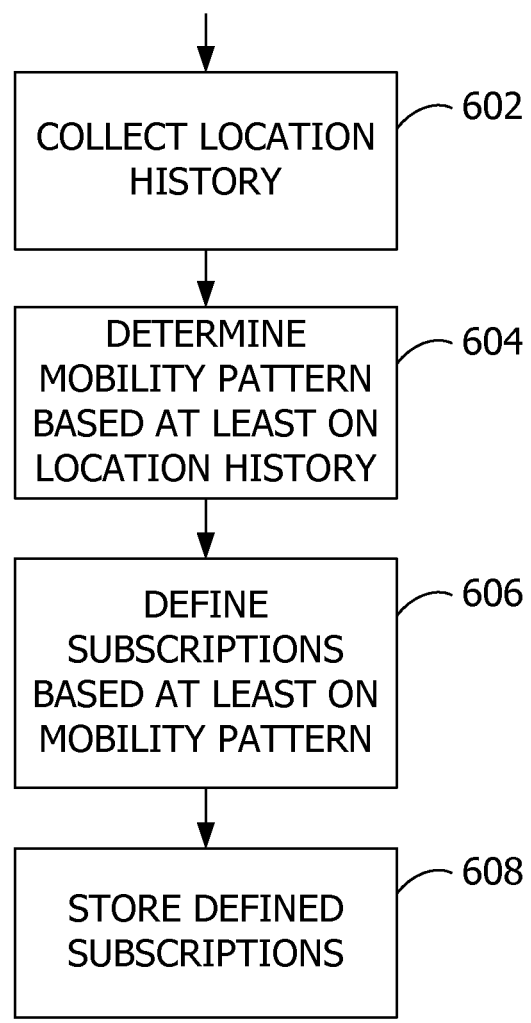
FIG. 6 is an exemplary flow chart illustrating the automatic creation of subscriptions based on location history.

Referring next to FIG. 6, an exemplary flow chart illustrates the automatic creation of the subscriptions 208 based on location history. A location history of the computing device 202 is collected at 602. For example, the computing device 202 stores the location information each time such information is received by the computing device 202. Additionally, the computing device 202 may store a time of receipt of the location information, and store cellular network information (e.g., data from the cellular network towers, or signal strength).

The location history may also include duration in a location. When the duration is aggregated over time, the location request scheduler 104 is able to determine the locations typically visited by the user 114 and to predict how much time is needed when the computing device 202 is subsequently in any of the locations. For example, if every morning the user 114 drives a child to school, the location request scheduler 104 knows on average that 10 minutes between 8:15 and 8:25 is spent per weekday at this location. The location request scheduler 104 may also keep track of the amount of time spent at a specific location regardless of the frequency of visits to that location. For example, if it usually takes 45 minutes to get through a grocery store, the location request scheduler 104 stores this data for use when later determining whether a trip to the grocery store can be inserted between appointments.

At 604, a mobility pattern is determined based at least on the location history. The mobility pattern represents, in some embodiments, the frequency of visits by the computing device 202 to particular locations, the frequency and timing of previous requests for the location information by the computing device 202 (e.g., request patterns), and other patterns discernible by the computing device 202. The mobility pattern may be calculated based on the collected location information, the time of receipt of the location information, the cellular network information, map data, data received from an automobile in which the computing device 202 has travelled, and/or other data. In some embodiments, the mobility pattern may be used to infer the movement of the computing device 202. The inferred movement may correlate to, for example, activities of the user 114 (e.g., commuting patterns).

In an example in which the location history includes a plurality of locations, the computing device 202 calculates a duration of time spent at each of the locations as part of the mobility pattern. Further, the computing device 202 may correlate the location history with profile data or a point-of-interest (POI) database to generate a location tag for each of the locations. The profile data includes, in some embodiments, data associated with the user 114 of the computing device 202. For example, the profile data may include calendar data (e.g., appointments and work hours), task entries, a to-do list, and other user-specific data. The POI database provides a list of entities associated with particular locations (e.g., a mapping between landmarks or businesses and position coordinates or addresses). The location tag includes, for example, business names, "home" or "work" designations for the user 114, city names, park names, names for favorite places (e.g., hangouts) and the like. The computing device 202 prompts the user 114 to confirm the suggested tags. In some embodiments, the computing device 202 generates the location tags opportunistically by subscribing to receive the location information anytime the computing device 202 requests the location information for any of the application programs 110. The location tags may be used by the application programs 110 executing on the computing device 202.

One or more of the subscriptions 208 are defined at 606 based at least on the determined mobility pattern. For example, if the mobility pattern is a commuting pattern that indicates that a bridge is crossed every weekday morning at 8 am, a traffic application executing on the computing device 202 subscribes to automatically receive traffic information (e.g., a type of the location information) prior to 8 am every weekday. The traffic information includes, for example, local traffic conditions, traffic conditions along the typical route based on the commuting pattern, and traffic alerts. The location request scheduler 104 then schedules delivery of the traffic information to the traffic application in view of subscriptions from other application programs, as described herein. The traffic application receives the traffic information and provides the received traffic information to the user 114 at 8 am, in this example.

In a related example, the traffic application subscribes to automatically receive a position of the computing device 202 to determine how far the computing device 202 is from the bridge. The location request scheduler 104 then schedules delivery of the position information to the traffic application in view of the subscriptions from other application programs, as described herein. Based on the received position information, the traffic application tunes a radio in a car of the user 114 to obtain a traffic report, or selects a streaming traffic channel on the computing device 202 to provide the traffic information to the user 114. Similarly, a weather application may subscribe to receive weather updates or alerts prior to a determined evening commute time (e.g., determined based on the mobility pattern).

An exemplary function call for defining one of the subscriptions 208 takes the following form: subscribe(time value, application program identifier). Some embodiments include a third argument indicating the type of location information desired. The type of location information generally includes any query for location-based information. For example, the type of location information includes, but is not limited to, one or more of the following: a position of the computing device 202 (e.g., an absolute position such as a latitude and longitude value, or a position relative to another object or device), information describing an area surrounding the position (e.g., neighborhood information, census information, points of interest, etc.), business information associated with the area surrounding the position (e.g., names and telephone numbers of local businesses, coupons to local businesses, cellular tower identifier, etc.), and the like. The type of location information may be determine by examining a history of the type of location information requested by the application program 110, by polling the application program 110, or by other means.

A fourth argument to the exemplary subscribe( ) function call may include a priority value. The priority value affects the delivery of the location information to the subscribing application program 110. For example, a lower priority value indicates that the location information is not essential to the application program 110. In such an example, the location request scheduler 104 may schedule the application program 110 to receive the location information after the time value 210 specified (e.g., delayed). In contrast, a higher priority value indicates that receiving the location information is critical to operation of the application program 110. In such an example, the location request scheduler 104 schedules the application program 110 to receive the location information at (or close to) the time value 210.

Additional arguments to the exemplary subscribe( ) function call include an accuracy criteria (e.g., tolerance factor or fuzz factor), filtering rules (e.g., geofence areas), and the like.

The subscriptions 208 may comprise one or more other subscriptions. The exemplary subscription 208 below contains three entries.

[("Location Report Type A", "Accuracy Criteria A", <Filtering Rule A1, Filtering Rule A2, . . . >), ("Location Report Type B", "Accuracy Criteria B", <Filtering Rule B1, Filtering rule B2, . . . >), ("Location Report Type C", "Accuracy Criteria C", <Filtering Rule C1, Filtering Rule C2, . . . >]

In some embodiments, the filtering rules are time-based such as <(Start Time, End Time), . . . > or geospatial-based such as <Geofence #1, . . . >. Other filtering rules not directly related to time or space specify a mode of transportation, battery level, radio signal strength, weather condition, direction of travel, and the like. Further, each of the subscriptions 208 may be single occurrence or multiple occurrence subscriptions.

At 608, the defined subscription is stored (e.g., in the memory area 204). The location request scheduler 104 then coordinates the newly defined subscription with the other subscriptions 208 to minimize the quantity of requests for the location information. In this example, the subscription is defined automatically by the computing device 202 based on the determined mobility pattern.

In other embodiments, the subscriptions 208 are defined based on calendar data (e.g., appointments), task entries, a to-do list, and other user-specific data. For example, the calendar data includes one or more calendar events each having an appointment time and location (e.g., 5 pm at a "Main Street Barbershop", 6 pm dinner at a "Main Street Restaurant"). In such an example, the subscriptions 208 are defined based on differences between the appointment times and distances between the locations of the calendar events. The subscription 208 may indicate that a calendar application requests the location information at a particular time to compute an estimated travel time to the next appointment. Alternatively, the subscription 208 may indicate that the calendar application requests the estimated travel time from another device (e.g., the other device computes the estimated travel time). As another example, the subscription 208 may indicate that the calendar application requests the location information at a particular time to dynamically adjust a reminder time (e.g., a time to remind the user 114 of the upcoming appointment) based on the estimated travel time between the locations. For example, upon receipt of the location information, the calendar application displays a message such "it will take 20 minutes for you to get to your next meeting based on current estimated travel times." In these examples, the estimated travel time is based on the movement of the computing device 202 relative to the locations of the calendar events. Further, aspects of the disclosure may take incident information (e.g., traffic congestion due to accidents, construction, etc.) into account when calculating the estimated travel time.

In some embodiments, the operations illustrated in FIG. 3 and FIG. 6 are performed by one or more of the components stored in the memory area 204 (e.g., see FIG. 2). Alternatively or in addition, some of the operations in FIG. 3 and FIG. 6 are performed by a cloud service. For example, the cloud service executes operations implementing the location request scheduler 104. Such an embodiment offloads the processing from the computing device 202 to the cloud service to reduce the computational burden on the computing device 202 (e.g., improve response time, reduce power consumption, reduce heat generation) and/or reduce the hardware needs of the computing device 202 (e.g., less processing capability, less memory space, etc.).

Figure 7:
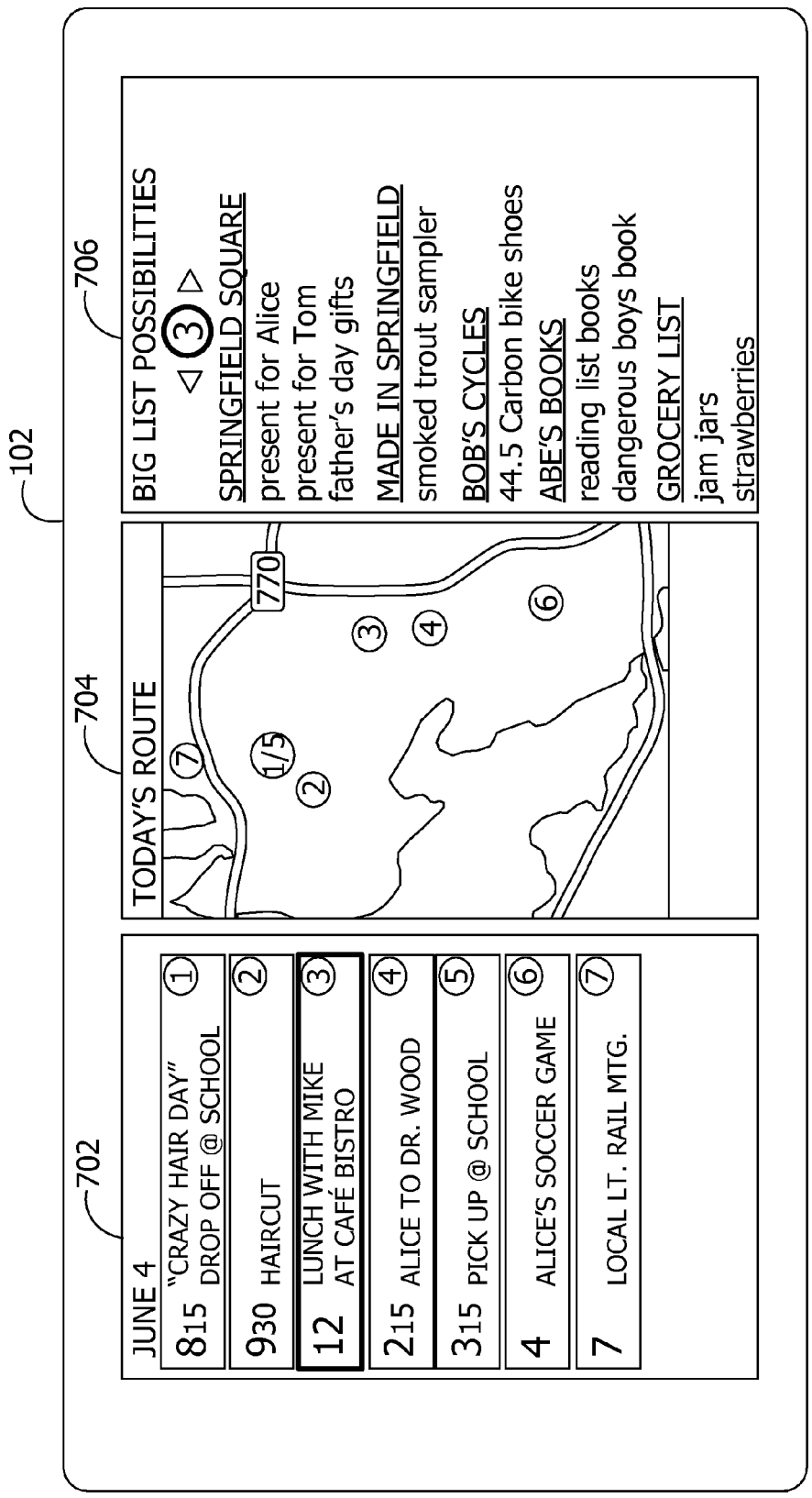
FIG. 7 is an exemplary user interface illustrating a calendar of events, a suggested route based on the events, and suggested activities at locations along the route to satisfy a to-do list.

Referring next to FIG. 7, an exemplary user interface has three portions. A first portion 702 illustrates a calendar of events, a second portion 704 illustrates a suggested route based on the events, and a third portion 706 illustrates suggested activities at locations along the route to satisfy a to-do list. In this example, the calendar application provides the calendar of events where each of the events has an appointment time and a location. The calendar application, or a routing application, determines and plots a route for one or more of the events for a particular day on a map. Alternatively or in addition, a task application compares task data (e.g., entries on a to-do list) to the locations along the route to determine if, when, and where any tasks may be completed during the particular day. The third portion 706 of the user interface displays the output of the task application: a list of locations along the route and the tasks to perform at each of the locations.

Additional Examples

Another application program 110 executing on the computing device 202 includes a shopping coupon application or service. This application or service relies on the determined mobility pattern to identify the commuting time periods, then subscribes to receive coupons (e.g., a type of the location information) during the commute home to timely suggest dinner, happy hour, or notify the user 114 of special discounts.

Further, the application program 110 may add user profile information or identity information to customize the coupon. Also, entry into a location (e.g., geofenced) may act as a trigger to notify the user 114 of a nearby store of interest. For example, if the location request scheduler 104 knows that the user 114 likes to buy books, the location request scheduler may notify the user 114 of a local bookstore (e.g., notification only, or notification with a coupon) once the computing device enters a particular location or region. In this example, the bookstore pays for the location trigger in a manner similar to the payment for keywords in a web search.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for coordinating requests for the location report to reduce a quantity of the requests, exemplary means for identifying the mobility pattern, and exemplary means for defining the subscriptions 208.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for execution on a mobile computing device, said system executing to reduce a quantity of requests from the mobile computing device for location reports from a network, said system comprising:
   a memory area for storing a plurality of subscriptions comprising application program identifiers related to application programs of the mobile computing device and particular time values the application programs are scheduled to request location information of the mobile computing device; and
   a processor of the mobile computing device programmed to: access the plurality of subscriptions stored in the memory area;
   determine, from the subscriptions, that a first application program is scheduled to request the location information at a first particular time value and a second application program is scheduled to request the location information at a second particular time value;
   determine the first particular time value associated with the first application program is within a pre-defined time tolerance relative to the second particular time value associated with the second application program;
   define a single request time to request the location information, the single request time defined to be within the pre-defined time tolerance between the first particular time value associated with the first application program and the second particular time value associated with the second application program;
   generate a location report for both the first application program and the second application program only during the single request time; and
   provide the generated location report to the at least two of the application programs.

2. The system of claim 1, wherein a location request scheduler executing on the mobile computing device aligns at least two of the requests into the single request based on a history of requests for the location information.

3. The system of claim 2, wherein alignment of the at least two requests for location information into the single request for the location information are also based on location affinity of at least two of the application programs identified by the application program identifiers associated with the at least two of the accessed plurality of subscriptions.

4. The system of claim 1, wherein the processor is further programmed to generate the location information by at least one of:
   receiving the location information from a location information provider, receiving the location information from a peer device co-located with the mobile computing device, or calculating the location information based on data obtained from local cellular towers.

5. The system of claim 1, wherein the first particular time value or the second particular time value is an exact time value.

6. The system of claim 1, wherein the processor is further programmed to: collect a location history of the mobile computing device; and
   automatically create the subscriptions based on the location history.

7. The system of claim 1, wherein the requests are aligned based on geofenced regions within a map.

8. A method comprising:
   accessing a plurality of subscriptions comprising application program identifiers related to application programs of a mobile computing device and particular time values the application programs are scheduled to request location information of the mobile computing device;
   determining, from the subscriptions, that a first application program is scheduled to request the location information at a first particular time value and a second application program is scheduled to request the location information at a second particular time value;
   determining the first particular time value associated with the first application program is within a pre-defined time tolerance relative to the second particular time value associated with the second application program;
   defining a single request time to request the location information, the single request time defined to be within the pre-defined time tolerance between the first particular time value associated with the first application program and the second particular time value associated with the second application program;
   generating a location report for both the first application program and the second application program only during the single request time; and
   providing the generated location report to the at least two of the application programs.

9. The method of claim 8, further comprising sharing location information received for the first application program with a peer computing device requesting location information.

10. The method of claim 8, further comprising aligning at least two of the requests for the location information into the single request based on a history of requests for the location information.

11. The method of claim 10, wherein alignment of the at least two requests for location information into the single request for the location information are also based on location affinity of at least two of the application programs identified by the application program identifiers associated with the at least two of the accessed plurality of subscriptions.

12. The method of claim 8, further comprising:
generating the location information by at least one of:
receiving the location information from a location information provider,
receiving the location information from a peer device co-located with the mobile computing device, or
alculating the location information based on data obtained from local cellular towers.

13. The method of claim 8, wherein a location request scheduler executing on the computing device automatically creates subscriptions based on a location history of the computing device, said subscriptions specifying types of events, parameters for the events, and actions to take when the events occur.

14. The method of claim 8, further comprising defining subscriptions based on a mobility pattern of the computing device.

15. The method of claim 14, wherein the subscriptions are further defined based on at least one of: calendar data, task entries, a to-do list, or other user-specific data.

16. One or more computer-readable devices embodying computer-executable instructions, which when executed by a processor associated with a mobile computing device perform operations comprising:
accessing a plurality of subscriptions comprising application program identifiers related to application programs of the mobile computing device and particular time values the application programs are scheduled to request location information of the mobile computing device;
determining, from the subscriptions, that a first application program is scheduled to request the location information at a first particular time value and a second application program is scheduled to request the location information at a second particular time value;
determining the first particular time value associated with the first application program is within a pre-defined time tolerance relative to the second particular time value associated with the second application program;
defining a single request time to request the location information, the single request time defined to be within the pre-defined time tolerance between the first particular time value associated with the first application program and the second particular time value associated with the second application program;
generating a location report for both the first application program and the second application program only during the single request time; and
providing the generated location report to the at least two of the application programs.

17. The computer-readable devices of claim 16, wherein the computer-executable instructions execute further to perform operations comprising sharing location information received for the one of the plurality of application programs with a peer computing device requesting location information in the one of the geofenced regions.

18. The computer-readable devices of claim 16, wherein the computer-executable instructions execute further to perform operations comprising aligning at least two of the requests for the location information into the single request based on a history of requests for the location information.

19. The computer-readable devices of claim 18, wherein alignment of the at least two requests for location information into the single request for the location information are also based on location affinity of at least two of the application programs identified by the application program identifiers associated with the at least two of the accessed plurality of subscriptions.

20. The computer-readable devices of claim 16, further comprising generating the location information by at least one of: receiving the location information from a location information provider, receiving the location information from a peer device co-located with the mobile computing device, or calculating the location information based on data obtained from local cellular towers.

* * * * *